United States Patent
Yoon et al.

(10) Patent No.: US 12,536,388 B2
(45) Date of Patent: Jan. 27, 2026

(54) LEARNING SELF-EVALUATION TO IMPROVE SELECTIVE PREDICTION IN LLMs

(71) Applicant: Google LLC, Mountain View, CA (US)

(72) Inventors: Jinsung Yoon, San Jose, CA (US); Jiefeng Chen, Madison, WI (US); Sayna Ebrahimi, Los Altos Hills, CA (US); Sercan Omer Arik, San Francisco, CA (US)

(73) Assignee: Google LLC, Mountain View, CA (US)

( * ) Notice: Subject to any disclaimer, the term of this patent is extended or adjusted under 35 U.S.C. 154(b) by 186 days.

(21) Appl. No.: 18/386,343

(22) Filed: Nov. 2, 2023

(65) Prior Publication Data

US 2024/0428015 A1 Dec. 26, 2024

Related U.S. Application Data

(60) Provisional application No. 63/521,930, filed on Jun. 20, 2023.

(51) Int. Cl.
*G06F 40/40* (2020.01)
(52) U.S. Cl.
CPC .................. *G06F 40/40* (2020.01)
(58) Field of Classification Search
None
See application file for complete search history.

(56) References Cited

U.S. PATENT DOCUMENTS

| | | | | |
|---|---|---|---|---|
| 2021/0209513 | A1* | 7/2021 | Torres | G06F 40/284 |
| 2023/0342559 | A1* | 10/2023 | Bhardwaj | G06N 20/00 |
| 2024/0296294 | A1* | 9/2024 | Imani | G06F 16/3329 |
| 2024/0419912 | A1* | 12/2024 | Somech | G06F 40/279 |

OTHER PUBLICATIONS

Chen et al. "Adaptation with Self-Evaluation to Improve Selective Prediction in LLMs". arXiv:2310.11689v2 [cs.CL] Nov. 11, 2023 (Year: 2023).*
Huang et al. "Large Language Models Can Self-Improve". arXiv:2210.11610v2 [cs.CL] Oct. 25, 2022 (Year: 2022).*
Amayuelas et al. ("Knowledge of Knowledge: Exploring Known-Unknowns Uncertainty with Large Language Models". arXiv:2305.13712v1 [cs.CL] May 23, 2023 (Year: 2023).*
Madaan et al. ("Self-Refine: Iterative Refinement with Self-Feedback". arXiv:2303.17651v2 [cs.CL] May 25, 2023 (Year: 2023).*

(Continued)

*Primary Examiner* — Jesse S Pullias
(74) *Attorney, Agent, or Firm* — Lerner David LLP

(57) ABSTRACT

Aspects of the disclosure are directed to methods, systems, and computer readable media for adaptation with self-evaluation to improve selective prediction in large language models (LLMs), generally referred to as ASPIRE. ASPIRE includes training LLMs on a portion of training data from a question answering task to learn self-evaluation, e.g., learn to distinguish whether a generated answer is correct or not. ASPIRE further includes a selection score that combines a likelihood of that generated answer is correct with a self-evaluation score for selective prediction. ASPIRE demonstrates improved selective prediction performance with less computational cost.

20 Claims, 7 Drawing Sheets

(56) References Cited

OTHER PUBLICATIONS

Wang et al. "Self-Instruct: Aligning Language Models with Self-Generated Instructions". arXiv:2212.10560v2 [cs.CL] May 25, 2023 (Year: 2023).*

Madaan et al. "Self-Refine: Iterative Refinement with Self-Feedback". rXiv:2303.17651v2 [cs.CL] May 25, 2023 (Year: 2023).*

Adina Williams, Nikita Nangia, and Samuel R Bowman. 2017. A broad-coverage challenge corpus for sentence understanding through inference. arXiv preprint arXiv:1704.05426. 12 pages.

Ashish Vaswani, Noam Shazeer, Niki Parmar, Jakob Uszkoreit, Llion Jones, Aidan N Gomez, Lukasz Kaiser, and Illia Polosukhin. 2017. Attention is all you need. Advances in neural information processing systems, 30. 15 pages.

Brian Lester, Rami Al-Rfou, and Noah Constant. 2021. The power of scale for parameter-efficient prompt tuning. In Proceedings of the 2021 Conference on Empirical Methods in Natural Language Processing, pp. 3045-3059.

Chenglei Si, Zhe Gan, Zhengyuan Yang, Shuohang Wang, Jianfeng Wang, Jordan Boyd-Graber, and Lijuan Wang. 2022. Prompting gpt-3 to be reliable. arXiv preprint arXiv:2210.09150. 24 pages.

Chin-Yew Lin and Franz Josef Och. 2004. Automatic evaluation of machine translation quality using longest common subsequence and skip-bigram statistics. In Proceedings of the 42nd Annual Meeting of the Association for Computational Linguistics (ACL-04), pp. 605-612.

Edward J Hu, Yelong Shen, Phillip Wallis, Zeyuan Allen-Zhu, Yuanzhi Li, Shean Wang, Lu Wang, and Weizhu Chen. 2021. Lora: Low-rank adaptation of large language models. arXiv preprint arXiv:2106.09685. 26 pages.

Elizabeth Bondi, Raphael Koster, Hannah Sheahan, Martin Chadwick, Yoram Bachrach, Taylan Cemgil, Ulrich Paquet, and Krishnamurthy Dvijotham. 2022. Role of human-ai interaction in selective prediction. In Proceedings of the AAAI Conference on Artificial Intelligence, vol. 36, pp. 5286-5294.

Gabriel Poesia, Oleksandr Polozov, Vu Le, Ashish Tiwari, Gustavo Soares, Christopher Meek, and Sumit Gulwani. 2022. Synchromesh: Reliable code generation from pre-trained language models. arXivpreprint arXiv:2201.11227. 19 pages.

Ji Xin, Raphael Tang, Yaoliang Yu, and Jimmy Lin. 2021. The art of abstention: Selective prediction and error regularization for natural language processing. In Proceedings of the 59th Annual Meeting of the Association for Computational Linguistics and the 11th International Joint Conference on Natural Language Processing (vol. 1: Long Papers), pp. 1040-1051.

Jie Ren, Jiaming Luo, Yao Zhao, Kundan Krishna, Mohammad Saleh, Balaji Lakshminarayanan, and Peter J Liu. 2022. Out-of-distribution detection and selective generation for conditional language models. arXiv preprint arXiv:2209.15558. 22 pages.

Karan Singhal, Tao Tu, Juraj Gottweis, Rory Sayres, Ellery Wulczyn, Le Hou, Kevin Clark, Stephen Pfohl, Heather Cole-Lewis, Darlene Neal, et al. 2023. Towards expert-level medical question answering with large language models. arXiv preprint arXiv:2305.09617. 30 pages.

Liyan Tang, Zhaoyi Sun, Betina Idnay, Jordan G Nestor, Ali Soroush, Pierre A Elias, Ziyang Xu, Ying Ding, Greg Durrett, Justin Rousseau, et al. 2023. Evaluating large language models on medical evidence summarization. medRxiv, 17 pages.

Lorenz Kuhn, Yarin Gal, and Sebastian Farquhar. 2023. Semantic uncertainty: Linguistic invariances for uncertainty estimation in natural language generation. In The Eleventh International Conference on Learning Representations. 19 pages.

Neeraj Varshney, Swaroop Mishra, and Chitta Baral. 2022. Investigating selective prediction approaches across several tasks in iid, ood, and adversarial settings. In Findings of the Association for Computational Linguistics: ACL 2022, pp. 1995-2002.

Pengcheng He, Xiaodong Liu, Jianfeng Gao, and Weizhu Chen. 2020. Deberta: Decoding-enhanced bert with disentangled attention. arXiv preprint arXiv:2006.03654. 17 pages.

Saurav Kadavath, Tom Conerly, Amanda Askell, Tom Henighan, Dawn Drain, Ethan Perez, Nicholas Schiefer, Zac Hatfield Dodds, Nova DasSarma, Eli Tran-Johnson, et al. 2022. Language models (mostly) know what they know. arXiv preprint arXiv:2207.05221. 43 pages.

Shun Zhang, Zhenfang Chen, Yikang Shen, Mingyu Ding, Joshua B Tenenbaum, and Chuang Gan. 2023a. Planning with large language models for code generation. arXiv preprint arXiv:2303.05510. 28 pages.

Tianyi Zhang, Faisal Ladhak, Esin Durmus, Percy Liang, Kathleen McKeown, and Tatsunori B Hashimoto. 2023b. Benchmarking large language models for news summarization. arXiv preprint arXiv:2301.13848. 14 pages.

Xiao Liu, Kaixuan Ji, Yicheng Fu, Weng Lam Tam, Zhengxiao Du, Zhilin Yang, and Jie Tang. 2021a. P-tuning v2: Prompt tuning can be comparable to fine-tuning universally across scales and tasks. arXivpreprint arXiv:2110.07602. 7 pages.

Xiao Liu, Yanan Zheng, Zhengxiao Du, Ming Ding, Yujie Qian, Zhilin Yang, and Jie Tang. 2021b. Gpt understands, too. arXiv preprint arXiv:2103.10385. 10 pages.

Kuezhi Wang, Jason Wei, Dale Schuurmans, Quoc Le, Ed Chi, and Denny Zhou. 2022. Self-consistency improves chain of thought reasoning in language models. arXiv preprint arXiv:2203.11171. 24 pages.

Yonatan Geifman and Ran El-Yaniv. 2017. Selective classification for deep neural networks. Advances in neural information processing systems, 30. 10 pages.

Zhengbao Jiang, Jun Araki, Haibo Ding, and Graham Neubig. 2021. How can we know when language models know? on the calibration of language models for question answering. Transactions of the Association for Computational Linguistics, 9:962-977.

* cited by examiner

LEARNING SELF-EVALUATION TO IMPROVE SELECTIVE PREDICTION IN LLMs

CROSS-REFERENCE TO RELATED APPLICATIONS

The present application claims the benefit of the filing date of U.S. Provisional Patent Application No. 63/521,930, filed Jun. 20, 2023, the disclosure of which is hereby incorporated herein by reference.

BACKGROUND

Large Language Models (LLMs) can demonstrate impressive capabilities at natural language understanding, reasoning, and generation tasks, such as question answering, summarization, semantic classification, and code generation. Based on these impressive capabilities, LLMs are being considered for scenarios with higher stakes in decision making. However, a major bottleneck for the LLMs is reliability, as the LLMs may not guarantee accurate responses for all queries. The LLMs have yet to understand whether a generated response to a query is accurate, and more specifically, to refrain from outputting inaccurate responses.

BRIEF SUMMARY

Aspects of the disclosure are directed to methods, systems, and computer readable media for adaptation with self-evaluation to improve selective prediction in large language models (LLMs), generally referred to as ASPIRE. ASPIRE includes training LLMs on a portion of training data from a question answering task to learn self-evaluation, e.g., learn to distinguish whether a generated answer is correct or not. ASPIRE further includes a selection score that combines a likelihood of that generated answer being correct with a self-evaluation score for selective prediction. ASPIRE demonstrates improved selective prediction performance with less computational cost.

An aspect of the disclosure provides for a method for selective prediction, including: training, by one or more processors, a large language model (LLM) to a task to adjust first adaptable parameters to the task using training data; generating, by one or more processors, a plurality of outputs associated with the task using the LLM with the adjusted first adaptable parameters; training, by the one or more processors, the LLM on self-evaluation to adjust second adaptable parameters to the task; and generating, by the one or more processors, a prediction for the task using the LLM based on the first adaptable parameters and second adaptable parameters, the prediction comprising a self-evaluation score.

In an example, the LLM is a pretrained LLM. In another example, training the LLM to the task and on self-evaluation comprises fine-tuning the LLM using soft prompt tuning. In yet another example, training the LLM to the task further includes freezing model parameters of the LLM and adding and iteratively updating the first adaptable parameters for the LLM.

In yet another example, training the LLM on self-evaluation further includes determining whether each of the plurality of outputs is correct using an evaluation metric, freezing model parameters of the LLM and the optimized first adaptable parameters, and adding and iteratively updating the second adaptable parameters for the LLM. In another example, determining whether each of the plurality of outputs is correct further comprises labeling each of the plurality of outputs as correct or wrong. In yet another example, the evaluation metric compares a similarity of an output of the plurality of outputs to a reference output.

In yet another example, determining whether each of the plurality of outputs is correct further comprises determining whether the output is within a threshold of the reference output. In yet another example, the threshold is a Rouge threshold having a value large enough where outputs that are wrong are not determined to be correct.

Another aspect of the disclosure provides for a system including: one or more processors; and one or more storage devices coupled to the one or more processors and storing instructions that, when executed by the one or more processors, cause the one or more processors to perform operations for selective prediction, the operations including: training a large language model (LLM) to a task to adjust first adaptable parameters to the task using training data; generating a plurality of outputs associated with the task using the LLM with the adjusted first adaptable parameters; training the LLM on self-evaluation to adjust second adaptable parameters to the task; and generating a prediction for the task using the LLM based on the first adaptable parameters and second adaptable parameters, the prediction comprising a self-evaluation score.

In an example, the LLM is a pretrained LLM. In another example, training the LLM to the task and on self-evaluation comprises fine-tuning the LLM using soft prompt tuning. In yet another example, training the LLM to the task further includes freezing model parameters of the LLM and adding and iteratively updating the first adaptable parameters for the LLM.

In yet another example, training the LLM on self-evaluation further includes determining whether each of the plurality of outputs is correct using an evaluation metric, freezing model parameters of the LLM and the optimized first adaptable parameters, and adding and iteratively updating the second adaptable parameters for the LLM. In yet another example, determining whether each of the plurality of outputs is correct further comprises labeling each of the plurality of outputs as correct or wrong. In yet another example, the evaluation metric compares a similarity of an output of the plurality of outputs to a reference output.

In yet another example, determining whether each of the plurality of outputs is correct further comprises determining whether the output is within a threshold of the reference output. In yet another example, the threshold is a Rouge threshold having a value large enough where outputs that are wrong are not determined to be correct.

Yet another aspect of the disclosure provides for a non-transitory computer readable medium for storing instructions that, when executed by one or more processors, cause the one or more processors to perform operations for selective prediction, the operations including: training a large language model (LLM) to a task to adjust first adaptable parameters to the task using training data; generating a plurality of outputs associated with the task using the LLM with the adjusted first adaptable parameters; training the LLM on self-evaluation to adjust second adaptable parameters to the task; and generating a prediction for the task using the LLM based on the first adaptable parameters and second adaptable parameters, the prediction comprising a self-evaluation score. In an example, training the LLM to the task and on self-evaluation comprises fine-tuning the LLM using soft prompt tuning.

DETAILED DESCRIPTION

Large language models (LLMs) have recently shown great advances in a variety of tasks, including natural language understanding and generation. However, the usage of LLMs in high-stakes decision-making scenarios is still limited due to the potential for errors. The reliability of LLMs can be improved through selective prediction, allowing the LLMs to abstain from making predictions when unsure of the answer.

Selective prediction can generally refer to a deployment scenario for AI models where the AI models avoid low-confidence outputs to maintain a certain overall accuracy level. In some cases, LLMs can be capable of determining whether the generated response is accurate or not to avoid making incorrect predictions. If an LLM detects the potential for an answer to be incorrect in response to a specific question, it can generate a response conveying a statement such as 'I don't know' to avoid an erroneous answer.

Figure 1:
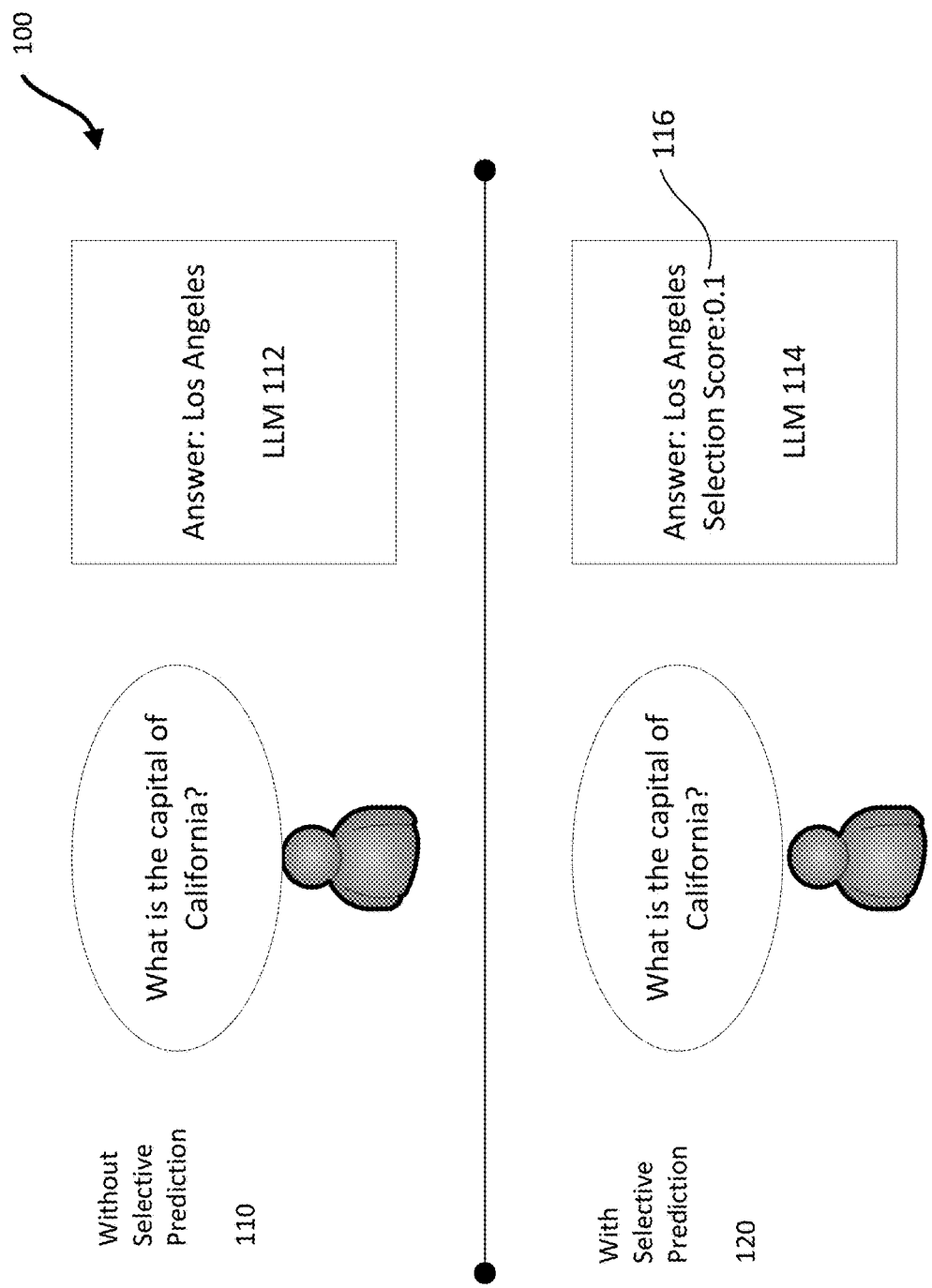
FIG. 1 depicts a block diagram of an example LLM output without selective prediction and with selective prediction according to aspects of the disclosure.

FIG. 1 depicts a block diagram of LLMs outputs 100 without selective prediction and with selective prediction according to aspects of the disclosure. When a question is presented, LLMs with selective prediction 120 can provide an answer with a confidence or selection score while LLMs without selective prediction 110 may just provide the answer. For example, for a question like 'What is the capital of California?', LLM models 112 without selective prediction might provide an incorrect answer like 'Los Angeles' instead of the correct answer, 'Sacramento.' Without selective prediction, LLMs 112 may directly output incorrect answers. With selective prediction, LLMs 114 can output a low selection score 116 along with the wrong answer. The low selection score 116 can provide a warning not to trust the answer.

LLMs are primarily trained to predict subsequent tokens in a context, lacking awareness of answer correctness for specific questions. Furthermore, since LLMs generate an output sequence in an auto-regressive manner, LLMs may not directly produce a confidence score for the output sequence. Consequently, acquiring a confidence score from LLMs for their output is not straightforward.

Fine-tuning LLMs on training data from the target question answering task using standard LLM training loss can improve selective prediction performance, which can improve accuracy of the predictions and increase the likelihood of the ground-truth answer for a given question. However, standard LLM fine-tuning does not reduce the likelihood of outputting wrong answers for a given question. Additionally, the increase of ground-truth answer likelihood may not result in a decrease of incorrect answer likelihood, as LLMs generate output sequences in an auto-regressive manner. Consequently, even after fine-tuning, wrong answers may still have high likelihood to be generated by the LLMs, resulting in difficulty separating correct and wrong answers based on the likelihood scores.

As such, the technology disclosed herein generally relates to a framework for learning self-evaluation to improve selective prediction in LLMs. The framework can generally be referred to as ASPIRE. The ASPIRE framework can be configured to train LLMs using relevant data from a question answering task, enabling the LLMs to learn to distinguish whether their proposed answers are correct or not. The trained LLMs can be configured to provide a selection score within the ASPIRE framework, which can combine the likelihood of the generated answer with the learned self-evaluation score for selective prediction. The overall computational complexity of the ASPIRE framework can be the same as that of generating an output for a query using an LLM, which is less computationally expensive compared to alternative approaches that require generating multiple output sequences to obtain an uncertainty measure. While the framework is described with respect to LLMs, the framework can be applied to any machine learning model or other artificial intelligence more generally.

Within the ASPIRE framework, an LLM can be pre-trained for any generative modeling task, such as question answering. To determine whether the output of the pre-trained LLM to the question answering task is correct or not, a reference output and an evaluation metric are utilized. The evaluation metric, such as a Rouge-L metric, can assess the similarity between the generated output and the reference output. For example, a Rouge-L metric can be employed as the evaluation metric to generate a score from $[0, 1]$. The correctness of the generated answer can be determined by comparing the score to a threshold value applied to the reference output. The generated score meeting the threshold value can be classified as correct answer, while generated scores falling below the threshold value can be classified as incorrect. The threshold value can be a value large enough where the generated answers that are incorrect are not determined to be correct.

Figure 2:
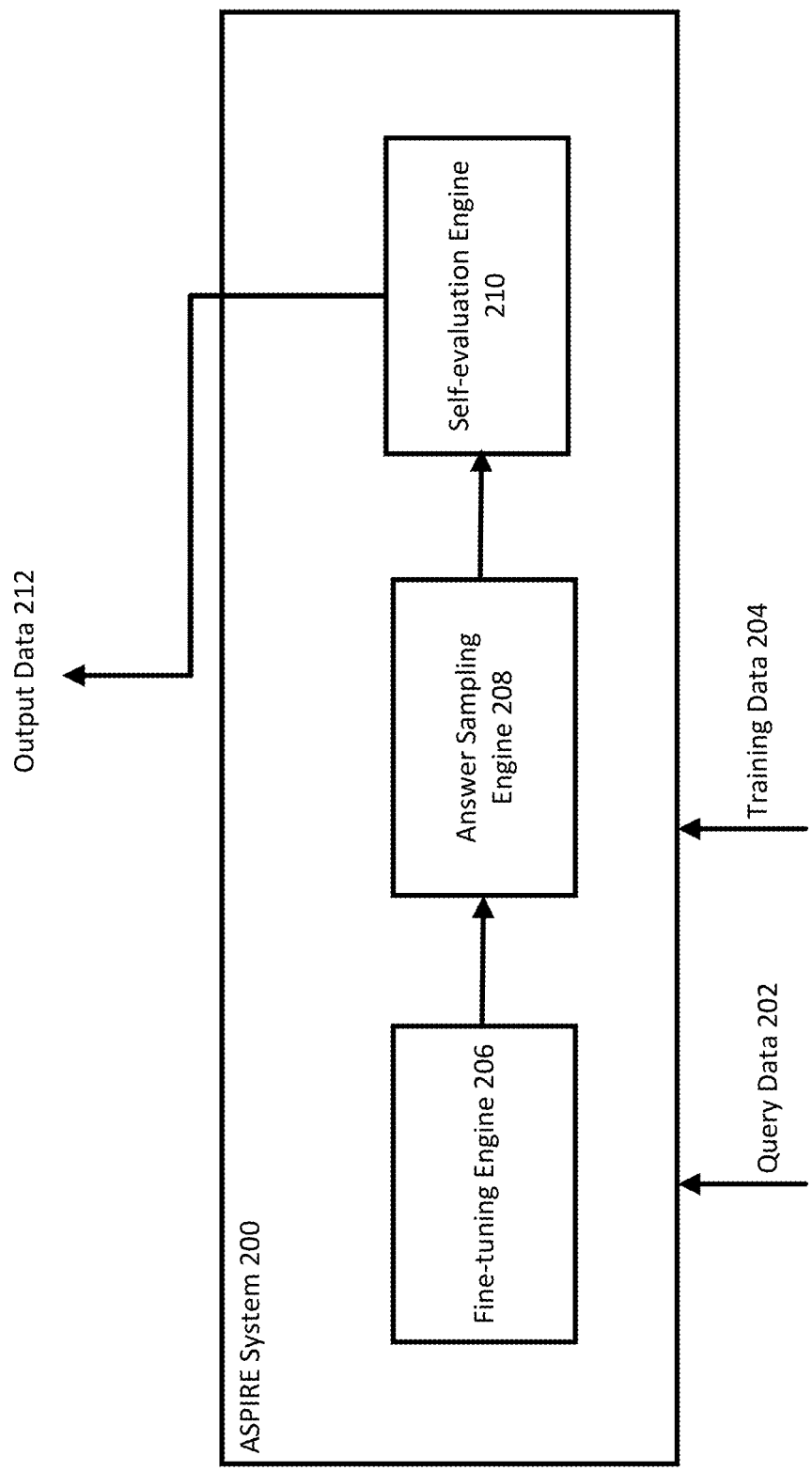
FIG. 2 depicts a block diagram of an example ASPIRE system for adaptation with self-evaluation to improve selective prediction in LLMs according to aspects of the disclosure.

FIG. 2 depicts a block diagram of an example system for adaptation with self-evaluation to improve selective prediction in LLMs. The ASPIRE system 200 can be implemented on one or more computing devices in one or more locations. For example, the ASPIRE system 200 can receive training data 204 for a generative task and query data 202 to adapt the pre-trained LLM to the question answering task. The ASPIRE system 200 can receive the inference data and/or training data as part of a call to an application programming interface (API) exposing the ASPIRE system 200 to one or more computing devices. The query data 202 and/or training data 204 can also be provided to the ASPIRE system 200 through a storage medium, such as remote storage connected to the one or more computing devices over a network. The query data 202 and/or training data 204 can further be provided as input through a user interface on a client computing device coupled to the ASPIRE system 200.

The query data 202 can include data associated with a prompt for a generative task, such as question-answering, summarization, semantic classification, and/or code generation. The training data 204 can correspond to training data associated with the generative task, such as data to train a large language model (LLM). The training data can be split into a training set, a validation set, and/or a testing set. An example training/validation/testing split can be an 80/10/10 split, although any other split may be possible.

The training data 204 can be in any form suitable for training a model, according to one of a variety of different learning techniques. Learning techniques for training a model can include supervised learning, unsupervised learning, semi-supervised learning techniques, parameter-efficient techniques and reinforcement learning techniques. Training the model can further include priming the model using zero- or few-shot prompting to output higher-quality responses. For example, the training data 204 can include multiple training examples that can be received as input by a model. The training examples can be labeled with a desired output for the model when processing the labeled training examples. The label and the model output can be evaluated through a loss function to determine an error, which can be back propagated through the model to update weights for the model. For example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met. From the query data 202 and/or training data 204, the ASPIRE system 200 can be configured to output one or more results related to selective prediction, generated as output data 212. The output data 212 can include answers on the query data 202 and/or a self-evaluating score associated with the generative task. As an example, the ASPIRE system 200 can be configured to send the output data 212 for display on a client or user display. As another example, the ASPIRE system 200 can be configured to provide the output data 212 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The ASPIRE system 200 can further be configured to forward the output data 212 to one or more other devices configured for translating the output data into an executable program written in a computer programming language. The ASPIRE system 200 can also be configured to send the output data 212 to a storage device for storage and later retrieval. The ASPIRE system 200 can include a fine-tuning engine 206, an answer sampling engine 208, and a self-evaluation engine 210. Given training data 204 for a generative task, the fine-tuning engine 206 can fine tune a LLM on the training data 204 to improve prediction performance. The fine-tuning engine 206 can be configured to train a LLM by keeping the model parameters fixed and adjusting adaptable parameters. The fine-tuning engine 206 can be configured to update, e.g., optimize, the adaptable parameters to train the LLM. The answer sampling engine 208 can be configured to generate multiple answers to each question of the query data 202 using the trained LLM. The answer sampling engine 208 can be configured to assess the correctness of the generated answers using an evaluation metric. The self-evaluation engine 210 can be configured to evaluate the correctness of generated answers to determine whether the trained LLM properly assessed the correctness of generated answers. The self-evaluation engine 210 can receive correctness of the generated answers as input and generate self-evaluation scores as outputs 212. The fine-tuning engine 206, answer sampling engine 208, and self-evaluation engine 210 can be implemented as one or more computer programs, specially configured electronic circuitry, or any combination thereof.

Figure 3:
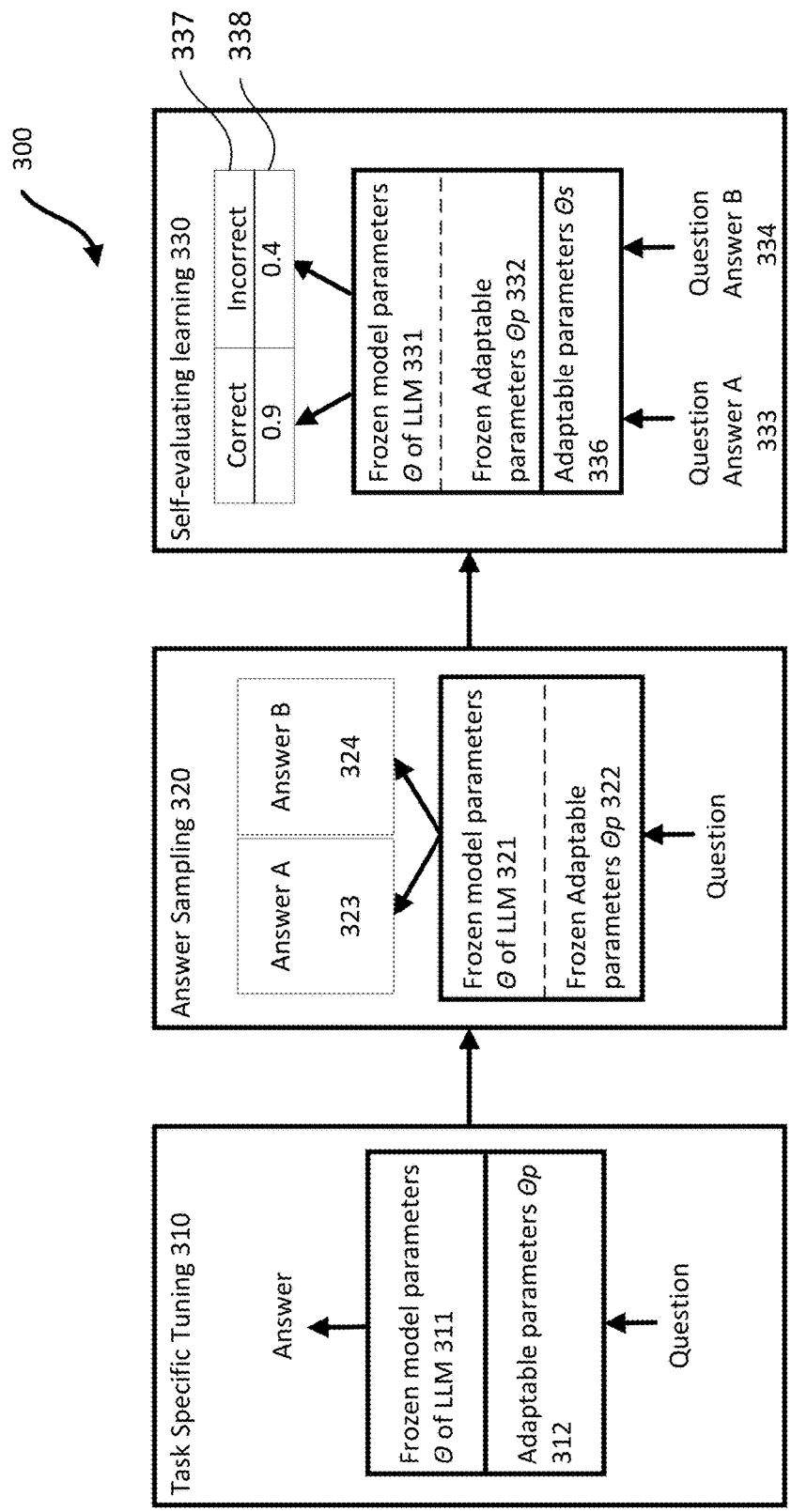
FIG. 3 depicts a block diagram of an example process performed by an ASPIRE system for a generative task according to aspects of the disclosure.

FIG. 3. depicts a block diagram of an example process 300 for a question answering task. The process 300 can be performed by the ASPIRE system 200 as depicted in FIG. 2. The fine-tuning engine 206 can be configured to refine the LLM, such as by applying parameter efficient tuning techniques like soft prompt tuning SPT to enhance prediction performance. Fine-tuning LLMs on downstream datasets after their pretraining leads to substantial performance improvements, compared to using pretrained LLMs directly. The parameter-efficient fine-tuning (PEFT) approach involves freezing the majority of pretrained LLM parameters fixed and fine-tuning only a subset of additional parameters, resulting in significant reduction in computational and storage costs. The ASPIRE system can employ SPT to enhance the selective prediction performance of LLMs. As shown in the task specific fine-tuning process 310, the fine-tuning engine 206 can perform fine-tuning on adaptable parameters while freezing, e.g., keeping the remaining parameters of the trained LLM constant.

The ASPIRE system 200 can be configured to receive the query data, such as a natural language query "Who was the man behind The Chipmunks?". The fine-tuning engine 206 can be configured to freeze, e.g., fix the value of model parameters θ of the LLM 311, and add adaptable parameters $\theta_p$ 312 for training the LLM 311. During the training, only the adaptable parameters $\theta_p$ 312 are subjected to iterative updates and/or optimizations.

To further enhance the performance of selective prediction, the ASPIRE system 200 can be configured to undergo additional fine-tuning. As shown in the answer sampling process 320, the answer sampling engine 208 can be configured to generate diverse answers for each query, achieved by sampling answers using the updated adaptable parameter θp. The answer sampling engine 208 can be configured to generate different answers for each query and evaluate the likelihood of these outputs. The answer sampling engine 208 can be configured to apply an evaluation metric to determine whether the generated outputs are correct or not, and the determination can be made based on a threshold value of the evaluation metric.

The ASPIRE system 200 can be configured to use a Rouge-L metric to evaluate if the predicted answer is correct or not. The Rouge-L metric can generate a score of [0,1] for the predicted answers. The generated scores can be compared to Rouge thresholds to determine the correctness of the generated answers. Specifically, the generated scores meeting the threshold value can be classified as correct outputs, while generated scores falling below the threshold value can be classified as incorrect. The answer sampling engine 208 can be configured to label each of the answers based on the determination. The threshold can be predetermined based on prior sampling, as setting the threshold too high or too low may result in misclassification of correct answers as incorrect and/or incorrect answers as correct. Example threshold values can be 0.6, 0.7, or 0.8.

The answer sampling engine 208 can generate answer A 323 and answer B 324 for a single question. During the answer sampling 320, the answer sampling engine 208 can be configured to fix both the values of model parameters θ and updated adaptable parameters $\theta_p$. The generated multiple answers can be subjected to evaluation for correctness using answer metrics and compared to the threshold value. The generated score for answer A via the evaluation metric, exceeding the threshold can be designated as correct answer 323, whereas the generated score for answer B failing to reach the threshold value can be categorized as incorrect answer 324. Consequently, the ASPIRE system 200 can be configured to acquire the answers and the likelihoods of whether the answers are correct or not as outputs.

After sampling high-likelihood outputs for each query, the self-evaluation learning process 330 can be performed by a self-evaluation engine 210. A self-evaluation engine 210 can be configured to compute a self-evaluation score. The ASPIRE system 200 can be configured to receive the outputs of the answer sampling process 320 as input. The input can include a pair of tokens that can indicate the correctness of the generated answers. The ASPIRE system 200 can be configured to add additional adaptable parameters $\theta_s$ 336 to the pre-trained LLM and further fine-tune the additional adaptable parameters $\theta_s$ 336 for learning self-evaluation. Since answer generation only depends on model parameters θ and adaptable parameters $\theta_p$, the ASPIRE system 200 can be configured to fix the values of the model parameters θ 331 and the optimized adaptable parameters $\theta_p$ 332 to avoid changing the prediction behaviors of the LLM when learning self-evaluation, while additional adaptable parameters $\theta_s$ 336 are introduced. The additional adaptable parameters $\theta_s$ 336 can be configured to also be updated and optimized during training.

After training both adaptable parameters $\theta_p$ and $\theta_s$, the self-evaluation engine 210 can be configured to utilize a beam search decoding method to define a selection scoring function, enabling the selection scoring function to obtain the prediction for the input query.

The output of the prediction can include the correctness of the generated output 337 and the self-evaluation score 338. The self-evaluation score 338 can include any type of likelihood defined as a selection scoring function. Since the input 333 and 334 are constructed by appending additional tokens to the initial query, the ASPIRE system 200 can be configured to reuse the states in the answer sampling process 320 instead of recomputing them to save computational cost.

Figure 4:
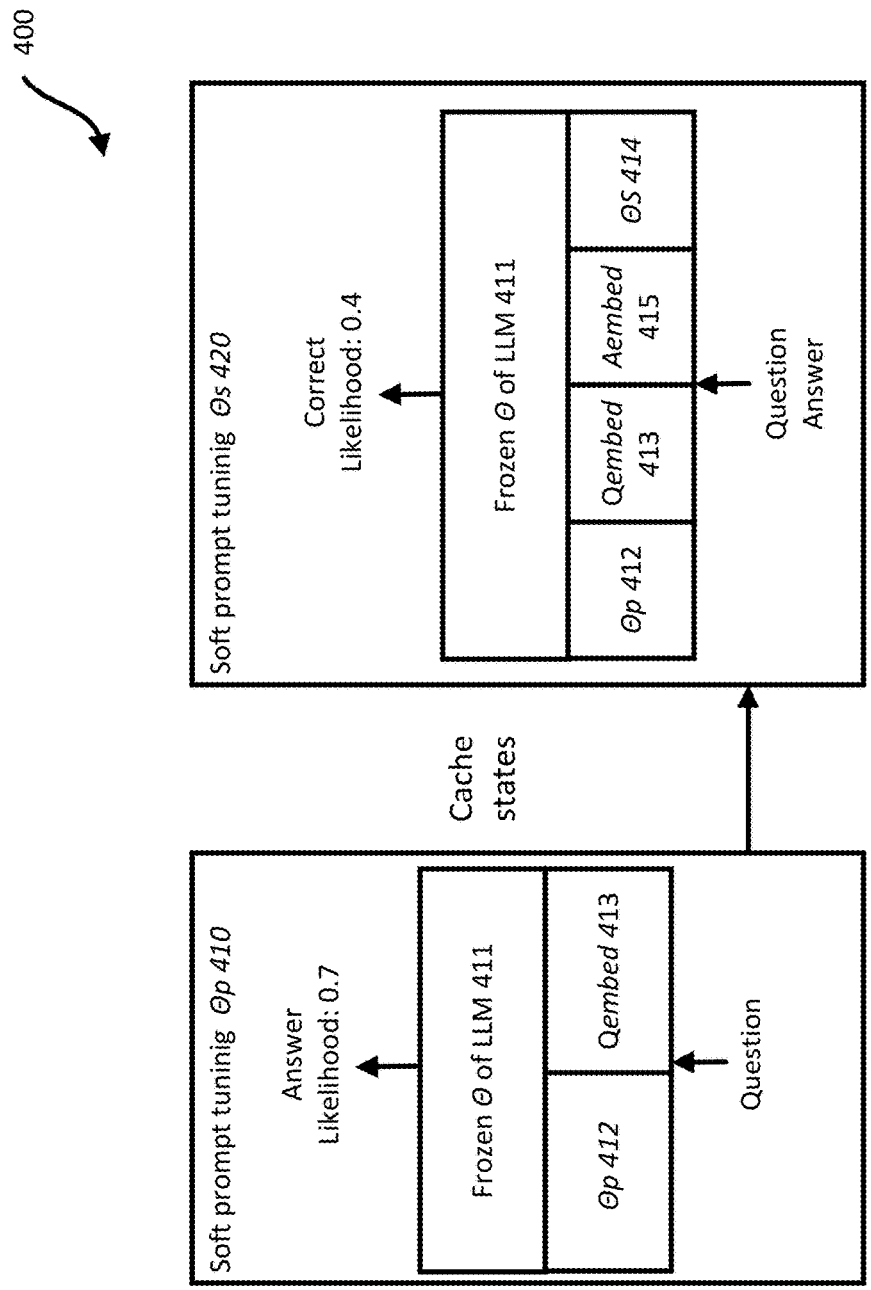
FIG. 4 depicts a block diagram of example soft prompt tuning implemented by an ASPIRE system according to aspects of the disclosure.

FIG. 4 depicts a block diagram implementing the framework with SPT according to the ASPIRE system 200. The SPT approach involves keeping the majority of pretrained LLM parameters fixed and fine-tuning only a subset of additional parameters, resulting in significant reduction in computational and storage costs. The adaptable parameters $\theta_p$ 412 and adaptable parameters $\theta_s$ 414 can be trained using different parameter efficient tuning approaches. The adaptable parameters $\theta_p$ 412 and adaptable parameters $\theta_s$ 414 are learnable soft prompt embeddings. $Q_{embed}$ 413 and $A_{embed}$ 415 are input embeddings for the question and answer respectively and both values remain constant. As shown in 410, the ASPIRE system 200 can be configured to generate the answer and the likelihood of the answer for the question via the LLM with the fine-tuned adaptable parameters $\theta_p$ and embeddings of the question, while keeping the model parameters θ of LLM 411 frozen. As shown in block 420, the ASPIRE system can be configured to acquire the correctness of the answer and calculate the self-evaluation score via the additional fine-tuned adaptable parameters $\theta_s$ and embeddings of the answers, while also keeping the model parameters θ of LLM 411, the updated adaptable parameters $\theta_p$ 412 and $Q_{embed}$ 413 frozen. The ASPIRE system 200 can be configured to cache the states when generating the answer and reuse those states when computing the self-evaluation score to save computational cost.

Figure 5:
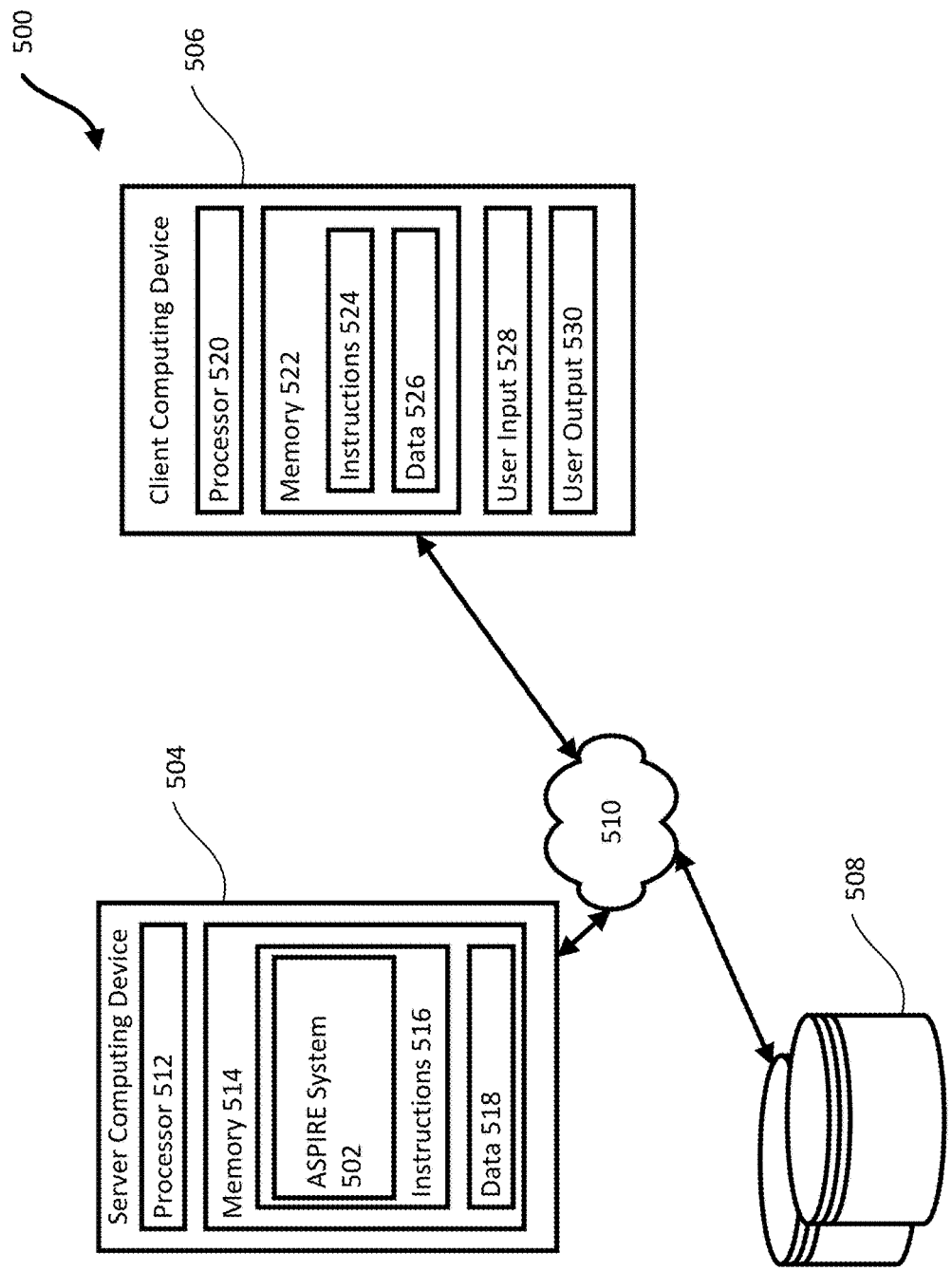
FIG. 5 depicts a block diagram of an example environment for implementing an ASPIRE system according to aspects of the disclosure.

FIG. 5 depicts a block diagram of an example computing environment 500 implementing an example ASPIRE system 502. For example, the ASPIRE system 502 can be the ASPIRE framework 200 described in FIG. 2. The ASPIRE system 502 can be implemented on one or more devices having one or more processors in one or more locations, such as in server computing device 504. User computing device 506 and the server computing device 504 can be communicatively coupled to one or more storage devices 508 over a network 510. The storage devices 508 can be a combination of volatile and non-volatile memory and can be at the same or different physical locations than the computing devices 504, 506. For example, the storage device(s) 508 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 504 can include one or more processors 512 and memory 514. The memory 514 can store information accessible by the processors 512, including instructions 516 that can be executed by the processors 512. The memory 514 can also include data 518 that can be retrieved, manipulated, or stored by the processors 512. The memory 514 can be a type of transitory or non-transitory computer readable medium capable of storing information accessible by the processors 512, such as volatile and non-volatile memory. The processors 512 can include one or more central processing units (CPUs), graphic processing units (GPUs), field-programmable gate arrays (FPGAs), and/or application-specific integrated circuits (ASICs), such as tensor processing units (TPUs).

The instructions 516 can include one or more instructions that, when executed by the processors 512, cause the one or more processors 512 to perform actions defined by the instructions 516. The instructions 516 can be stored in object code format for direct processing by the processors 512, or in other formats including interpretable scripts or collections of independent source code modules that are interpreted on demand or compiled in advance. The instructions 516 can include instructions for implementing ASPIRE system 502. The ASPIRE system 502 can be executed using the processors 512, and/or using other processors remotely located from the server computing device 504.

The data 518 can be retrieved, stored, or modified by the processors 512 in accordance with the instructions 516. The data 518 can be stored in computer registers, in a relational or non-relational database as a table having a plurality of different fields and records, or as JSON, YAML, proto, or XML documents. The data 518 can also be formatted in a computer-readable format such as, but not limited to, binary values, ASCII or Unicode. Moreover, the data 518 can include information sufficient to identify relevant information, such as numbers, descriptive text, proprietary codes, pointers, references to data stored in other memories, including other network locations, or information that is used by a function to calculate relevant data.

The user computing device 506 can also be configured similar to the server computing device 504, with one or more processors 520, memory 522, instructions 524, and data 526. The user computing device 506 can also include a user input 528, and a user output 530. The user input 528 can include any appropriate mechanism or technique for receiving input from a user, such as keyboard, mouse, mechanical actuators, soft actuators, touchscreens, microphones, and sensors.

The server computing device 504 can be configured to transmit data to the user computing device 506, and the user computing device 506 can be configured to display at least a portion of the received data on a display implemented as part of the user output 530. The user output 530 can also be used for displaying an interface between the user computing device 506 and the server computing device 504. The user output 530 can alternatively or additionally include one or more speakers, transducers or other audio outputs, a haptic interface or other tactile feedback that provides non-visual and non-audible information to the user of the user computing device 506.

Although FIG. 5 illustrates the processors 512, 520 and the memories 514, 522 as being within the computing devices 504, 506, components described herein, including the processors 512, 520 and the memories 514, 522 can include multiple processors and memories that can operate in different physical locations and not within the same computing device. For example, some of the instructions 516, 524 and the data 518, 526 can be stored on a removable SD card and others within a read-only computer chip. Some or all of the instructions 516, 524 and data 518, 526 can be stored in a location physically remote from, yet still accessible by, the processors 512, 520. Similarly, the processors 512, 520 can include a collection of processors that can perform concurrent and/or sequential operation. The computing devices 504, 506 can each include one or more internal clocks providing timing information, which can be used for time measurement for operations and programs run by the computing devices 504, 506.

The server computing device 504 can be configured to receive requests to process data from the user computing device 506. For example, the environment 500 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 506 may receive and transmit data specifying target computing resources to be allocated for executing a neural network trained to perform a particular neural network task.

The computing devices 504, 506 can be capable of direct and indirect communication over the network 510. The computing devices 504, 506 can set up listening sockets that may accept an initiating connection for sending and receiving information. The network 510 can include various configurations and protocols including the Internet, World Wide Web, intranets, virtual private networks, wide area networks, local networks, and private networks using communication protocols proprietary to one or more companies. The network 510 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 510, in addition or alternatively, can also support wired connections between the computing devices 504, 506, including over various types of Ethernet connection.

Although a single server computing device 504 and user computing device 506 are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 6:
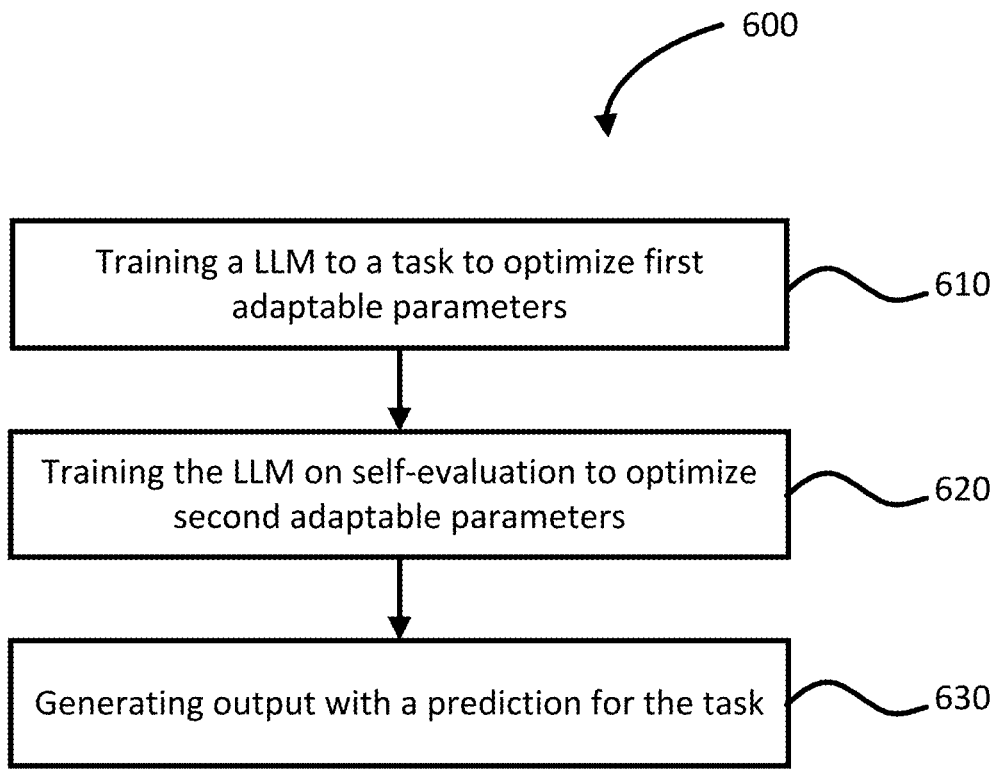
FIG. 6 depicts a flow diagram of an example process for training a machine learning model for the selective prediction according to aspects of the disclosure.

FIG. 6 depicts flow diagrams of an example process 600 for training a machine learning model for the selective prediction. The example process 600 can be performed on a system of one or more processors in one or more locations, such as the ASPIRE system 200 as depicted in FIG. 2. To generate the answer and obtain the selection score for a given question, two stages of LLM training can be performed. As shown in block 610, the first stage can be for training the LLM to adjust first adaptable parameters $\theta_p$ to a question answering task. The question answering can include the task of responding to various questions. After training the LLM for the first adaptable parameters $\theta_s$, the ASPIRE system 200 can generate multiple answers with the correctness of each answer.

As shown in block 620, the second stage of the ASPIRE system 200 can be for training the LLM on self-evaluation to improve the second adaptable parameters $\theta_s$. After training the LLM for the second adaptable parameters $\theta_s$, the ASPIRE system 200 can receive the output of the first stage as input. As shown in block 630, the ASPIRE system 200 can be configured to generate outputs with a prediction for the question answering task via the trained LLM.

Figure 7:
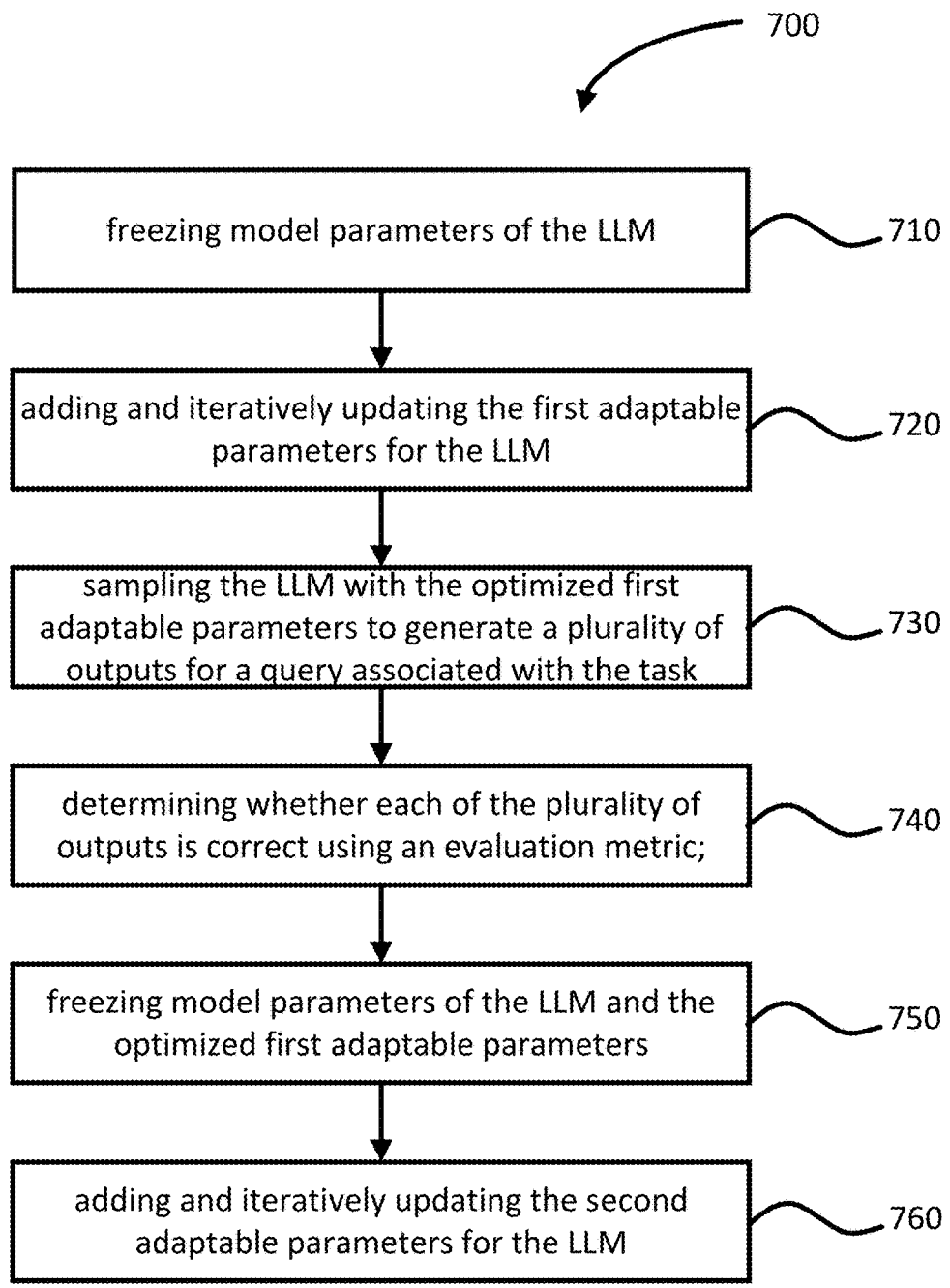
FIG. 7 depicts a flow diagram of an example process for performing a training step for training the machine learning model for the selective prediction according to aspects of the disclosure.

FIG. 7 depicts flow diagrams of an example process 700 for training a machine learning model for the selective prediction in further detail. The example process 700 can be performed on a system of one or more processors in one or more locations, such as the ASPIRE system 200 as depicted in FIG. 2.

As shown in block 710, to train the LLM to the task, the ASPIRE system 200 can be configured to freeze model parameters. The parameters related to the LLM are kept constant, and additional parameters for the SPT parameters are introduced to the ASPIRE system 200. As shown in block 720, the ASPIRE system 200 can be configured to add the first adaptable parameters for the SPT parameters and interactively update the first adaptable parameters.

As shown in block 730, the ASPIRE system 200 can be configured to employ the updated first adaptable parameters when sampling the LLM, generating a plurality of outputs for a query associated with the question answering task. These outputs can include multiple answers to a question. The ASPIRE system 200 can be configured to present the multiple answers in natural language format. As shown in block 740, the ASPIRE system 200 can be configured to determine whether each of the multiple answers are correct or incorrect using an evaluation metric. For example, the ASPIRE system 200 can be configured to use the Rouge-L metric to evaluate if the predicted answer is correct or not. The Rouge-L metric can generate a score of [0,1] for the predicted answers. The generated scores can be compared to Rouge thresholds, e.g., 0.6, 0.7, or 0.8, to determine the correctness of the generated answers. If the generated scores meet a threshold value, the ASPIRE system 200 can be configured to label the output as 'correct'; otherwise, the ASPIRE system 200 can be configured to label the output as 'incorrect'. Consequently, the ASPIRE system 200 can be configured to generate a likelihood of each output with the answers.

As shown in block 750, for learning self-evaluation, the ASPIRE system 200 can be configured to freeze model parameters of the LLM and the updated first adaptable parameters. Since the generated answers depend on model parameters of the LLM and the optimized first adaptable parameters, fixing the values of the model parameters of the LLM and the updated first adaptable parameters can avoid changing the prediction of the LLM when learning self-evaluation. As shown in block 760, the ASPIRE system 200 can be configured to add the second adaptable parameters $\theta_s$, for self-evaluation and update the second adaptable parameters $\theta_s$ iteratively.

After updating the second adaptable parameters, the generated likelihood of each output with the answers can be input back into the trained LLM for self-evaluation. The ASPIRE system 200 can be configured to compute the self-evaluation score to each answer via the trained LLM with the updated first parameters and the updated second parameter. As an example, the ASPIRE system 200 can be configured to utilize a beam search decoding method to define a selection scoring function. Using the defined selection scoring function, the ASPIRE system 200 can be configured to generate the self-evaluation scores to each input query. The LSEP system 200 can cache the states when generating the answer and reuse the states in the first stage when computing the self-evaluation score to save computational cost.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification, the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for selective prediction, comprising:
training, by one or more processors, a large language model (LLM) to a task by adjusting first adaptable parameters to the task using training data;
generating, by one or more processors, a plurality of outputs associated with the task using the LLM with the adjusted first adaptable parameters;
training, by the one or more processors, the LLM on self-evaluation by:
freezing the adjusted first adaptable parameters;
determining whether each of the plurality of outputs is correct using an evaluation metric; and
adjusting second adaptable parameters for the LLM based on the determination; and
generating, by the one or more processors, a prediction for the task using the LLM based on the adjusted first adaptable parameters and adjusted second adaptable parameters, the prediction comprising a self-evaluation score.

2. The method of claim 1, wherein the LLM is a pretrained LLM.

3. The method claim 1, wherein training the LLM to the task and on self-evaluation comprises fine-tuning the LLM using soft prompt tuning.

4. The method of claim 1, wherein training the LLM to the task further comprises:
freezing model parameters of the LLM; and
adding and iteratively updating the first adaptable parameters for the LLM.

5. The method of claim 1, wherein training the LLM on self-evaluation further comprises:
freezing model parameters of the LLM; and
adding and iteratively updating the second adaptable parameters for the LLM.

6. The method of claim 5, wherein determining whether each of the plurality of outputs is correct further comprises labeling each of the plurality of outputs as correct or wrong.

7. The method of claim 5, wherein the evaluation metric compares a similarity of an output of the plurality of outputs to a reference output.

8. The method of claim 7, wherein determining whether each of the plurality of outputs is correct further comprises determining whether the output is within a threshold of the reference output.

9. The method of claim 8, wherein the threshold is a Rouge threshold having a value large enough where outputs that are wrong are not determined to be correct.

10. A system comprising:
one or more processors; and
one or more storage devices coupled to the one or more processors and storing instructions that, when executed by the one or more processors, cause the one or more processors to perform operations for selective prediction, the operations comprising:

training a large language model (LLM) to a task by adjusting first adaptable parameters to the task using training data;

generating a plurality of outputs associated with the task using the LLM with the adjusted first adaptable parameters;

training the LLM on self-evaluation by:
    freezing the adjusted first adaptable parameters;
    determining whether each of the plurality of outputs is correct using an evaluation metric; and
    adjusting second adaptable parameters for the LLM based on the determination; and generating a prediction for the task using the LLM based on the adjusted first adaptable parameters and adjusted second adaptable parameters, the prediction comprising a self-evaluation score.

11. The system of claim 10, wherein the LLM is a pretrained LLM.

12. The system of claim 10, wherein training the LLM to the task and on self-evaluation comprises fine-tuning the LLM using soft prompt tuning.

13. The system of claim 10, wherein training the LLM to the task further comprises:
    freezing model parameters of the LLM; and
    adding and iteratively updating the first adaptable parameters for the LLM.

14. The system of claim 10, wherein training the LLM on self-evaluation further comprises:
    freezing model parameters of the LLM; and
    adding and iteratively updating the second adaptable parameters for the LLM.

15. The system of claim 14, wherein determining whether each of the plurality of outputs is correct further comprises labeling each of the plurality of outputs as correct or wrong.

16. The system of claim 14, wherein the evaluation metric compares a similarity of an output of the plurality of outputs to a reference output.

17. The system of claim 16, wherein determining whether each of the plurality of outputs is correct further comprises determining whether the output is within a threshold of the reference output.

18. The system of claim 17, wherein the threshold is a Rouge threshold having a value large enough where outputs that are wrong are not determined to be correct.

19. A non-transitory computer readable medium for storing instructions that, when executed by one or more processors, cause the one or more processors to perform operations for selective prediction, the operations comprising:

training a large language model (LLM) to a task by adjusting first adaptable parameters to the task using training data;

generating a plurality of outputs associated with the task using the LLM with the adjusted first adaptable parameters;

training the LLM on self-evaluation by:
    freezing the adjusted first adaptable parameters;
    determining whether each of the plurality of outputs is correct using an evaluation metric; and
    adjusting second adaptable parameters for the LLM based on the determination; and generating a prediction for the task using the LLM based on the adjusted first adaptable parameters and adjusted second adaptable parameters, the prediction comprising a self-evaluation score.

20. The non-transitory computer readable medium of claim 19, wherein training the LLM to the task and on self-evaluation comprises fine-tuning the LLM using soft prompt tuning.

* * * * *